United States Patent [19]

Bickhardt et al.

[11] Patent Number: 5,763,501
[45] Date of Patent: Jun. 9, 1998

[54] PROCESS FOR THE PRODUCTION OF MULTI-LAYER CONSTRUCTED COVERINGS BASED ON POLYOLEFINS WITH FOAMED INTERMEDIATE LAYERS

[75] Inventors: Susanne Bickhardt, Stuttgart; Norbert Mueller, Frankenthal; Brigitte Rein, Ludwigshafen; Volker Hofmann, Monsheim, all of Germany

[73] Assignee: Tarkett Aktiengesellschaft, Frankenthal, Germany

[21] Appl. No.: 772,258

[22] Filed: Dec. 23, 1996

[30] Foreign Application Priority Data

Dec. 23, 1995 [DE] Germany ............ 195 48 681.1

[51] Int. Cl.$^6$ ............ B29C 43/22; B29C 64/20
[52] U.S. Cl. ............ 521/142; 264/45.1; 264/45.8; 264/46.3; 264/53; 264/54; 264/55; 428/304.4; 521/143
[58] Field of Search ............ 521/142, 143; 264/53, 54, 55, 45.1, 45.8, 46.3; 428/304.4

[56] References Cited

U.S. PATENT DOCUMENTS

| 4,680,317 | 7/1987 | Kuhnel et al. | 521/89 |
|---|---|---|---|
| 5,278,236 | 1/1994 | Case et al. | 525/189 |
| 5,278,272 | 1/1994 | Lai et al. | 526/348 |
| 5,340,840 | 8/1994 | Park et al. | 521/60 |
| 5,369,136 | 11/1994 | Park et al. | 521/143 |
| 5,407,617 | 4/1995 | Oppermann et al. | 264/46.4 |
| 5,407,965 | 4/1995 | Park et al. | 521/79 |

FOREIGN PATENT DOCUMENTS

| 0 259 531 | 3/1988 | European Pat. Off. |
| 0 273 654 | 7/1988 | European Pat. Off. |
| 0 416 815 | 3/1991 | European Pat. Off. |
| 0 608 903 | 8/1994 | European Pat. Off. |
| 0 621 128 | 10/1994 | European Pat. Off. |
| 31 32 439 | 5/1984 | Germany. |
| 41 21 401 | 1/1993 | Germany. |
| 41 35 937 | 5/1993 | Germany. |
| 2 191 209 | 12/1987 | United Kingdom. |

OTHER PUBLICATIONS

Saechtling, "Plastics Handbook", Carl Hanser Verlag Munchen Wien.
Patent Abstract of Japan, Sato, "Manufacture of Vinyl Chloride Resin", JP 92-125276, Bando Chemical Ind., Japan Kokai Tokkyo Koho, p. 5, (1995).
Patent Abstract of Japan, Shohei, JP 90-152535, Nissan Motor Co., Ltd., Japan; Kanegafuchi Kagaku Kogyo K.K., Kokai Tokkyo Koho, p.5.

*Primary Examiner*—Morton Foelak
*Attorney, Agent, or Firm*—Foley & Lardner

[57] ABSTRACT

A process for the production of at least one foamed layer of polyolefins comprising: polymerizing a polyolefin elastomer (POE) or polyolefin plastomer (POP) and optionally one or more additional polyolefins with a metallocene catalyst to form a polymerized polyolefin; mixing said polymerized polyolefin, up to 100 parts by weight of a mineral filling material and from 1–10 parts by weight of a chemical propellant based on 100 parts by weight of said polymerized polyolefins to form a sheet layer mixture; rolling said sheet layer mixture on a multiroller calender to produce a sheet layer; heating at least one sheet layer at a temperature above the decomposition point of the chemical propellant so as to foam the sheet layer and form at least one foamed layer. The present invention is also concerned with new coverings which are produced according to this process.

14 Claims, 1 Drawing Sheet sheet 1 sheet 2 with decoration foam sheet No. 1 sheet 1 sheet 2 with decoration foam sheet No. 1 sheet 2 without decoration sheet 1 sheet 2 with decoration foam sheet No. 1 sheet 2 without decoration foam sheet No. 1 sheet 1 sheet 2 with decoration cross - linked foam sheet No. 2 foam sheet No. 1

PROCESS FOR THE PRODUCTION OF MULTI-LAYER CONSTRUCTED COVERINGS BASED ON POLYOLEFINS WITH FOAMED INTERMEDIATE LAYERS

BACKGROUND OF THE INVENTION

1. Field of the Invention

The present invention is directed to a process for the production of multi-layer constructed coverings based on polyolefins with foamed intermediate layers.

2. Description of Related Art

In order to improve the properties of floor coverings, such as to increase walking comfort, absorb the sound of footsteps, and absorb heat (foot warmth), appropriate foamed sheets are frequently placed underneath the floor covering.

If the foamed foil does not have firm connection with the covering, an additional working step is required.

In the case of multi-layer covering constructions, one or more compact layers may be replaced by thicker foamed layers or additionally, foamed layers can be introduced separately. Thus, in the case of the same total layer thickness, weight can be saved since the resulting foam provides additional volume. That is, floor covering constructions including foamed layers are less dense and therefore, have a lower weight than floor coverings of the same thickness which do not include one or more foamed layers. If the foamed layer is soft and elastic, a final material can be obtained that is more supple and/or easier to lay.

The following processes are known for the production of foamed layers:

1) Plastisol foaming—The most frequently used process for forming foamed layers is the foaming of a plastisol layer, such as a pasty layer formed from synthetic material powder and plasticizer, either by mechanical introduction of air or by means of decomposable, gas-forming materials. The emissions caused by the use of the plasticizer and the dilution agent are disadvantageous.

2) Calendering—Calendering foams based on PVC and gas-forming materials have been known for a long time for use in the field of automobiles, artificial leather and wall coverings (See, i.e., Japanese Patents Nos. JP 92-125 276 920519 and JP 90-152 535 900613). The PVC used must also be softened and, because of the chlorine contained therein, is environmentally harmful. Hitherto, it has not been possible to produce a calendering foam based on polyolefins because the softening range of conventional polyolefins is too narrow to allow it to be worked up on calendars below the decomposition temperature of the foam former.

3) Extrusion—The extrusion of sheets of synthetic materials which contain thermally decomposable, foam-forming materials is described in EP 0 259 531 and DE 3132 439 C2. By subsequent heating of the sheet above the decomposition point of the foam former, the sheet is foamed.

Polyolefins which have a density ranging from 0.91–0.96 g/cm$^3$, rubber mixtures, as well as chlorinated polyethylenes are, at present, used for extrusion as basic raw materials. Cross-linking systems are typically used in the case of olefins, and non-cross-linked systems are generally only used in the case of chlorine-containing formulations.

The extrusion of wide layers (2–5 m), which are typically necessary, especially for floor coverings, is technically difficult or impossible.

4) Scattering technology—Carpet backings which consist of a scattered foam layer based on polyethylene, EVA (ethylene-vinyl acetate) and filling materials are known as taught in GB 2,191,209. In the use of scattering technology, the maintenance of a definite grain size distribution is important. In the above-mentioned GB patent, the particle size lies in the range of 100–800 µm. DE 41 21 401 also describes a scattering process for the production of multi-layer, foamed PVC-free floor coverings. The grain size in the DE document is taught as preferably lying in the range of 0–400 µm.

EP 0 621 128 describes a process for the production of multi-layer constructed thermoplastic floor coverings based on polyolefins. This document relates to a heterogenous sheet covering. In Example 4, there is described the possibility of introducing a foamed sheet based on EVA into the total construction. However, the doubling/lamination of an intermediate layer which has already been foamed is extremely difficult.

The mentioned scattering processes are technically very laborious because they generally require compounding and/ or grinding, and are difficult to control.

Foamed layers are already known, as described, for example in the above-mentioned documents. The disadvantages of prior processes include, for example, that many of the processes require the use of chlorine-containing products which give rise to problems in disposal/burning. In addition, in some processes, cross-linking is absolutely necessary so that the cell structure of the foam is stabilized. Cross-linked systems are difficult to control in the production process and, depending upon the degree of cross-linking, give rise to problems in the case of recycling. A large part of the mentioned documents require the use of EVA which, depending upon the type used, can also be regarded as being critical or a disadvantage because of its residual monomer content.

SUMMARY OF THE INVENTION

It is an object of the present invention to produce a foamed covering using calendering and doubling technology which substantially avoids the above-mentioned disadvantages. In accordance with these and other objects, there is provided a process for the production of at least one foamed layer of polyolefins comprising: obtaining a polyolefin elastomer (POE) or a polyolefin plastomer (POP) which has been polymerized with a metallocene catalyst, and optionally mixing said polyolefin elastomer or polyolefin plastomer with one or more additional polyolefins to form a polymerized polyolefin; mixing said polymerized polyolefin, up to 100 parts by weight of a mineral filling material and from 1–10 parts by weight of a chemical propellant based on 100 parts by weight of said polymerized polyolefins to form a sheet layer mixture; rolling said sheet layer mixture on a multiroller calender to produce a sheet layer; heating at least one sheet layer at a temperature above the decomposition point of the chemical propellant so as to foam the sheet layer and form at least one foamed layer.

In further accordance with these and other objects, there is provided coverings which are produced according to this process.

Additional objects, features, and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiments given below, serve to explain the principles of the invention.

DETAILED DESCRIPTION OF PREFERRED EMBODIMENTS

Figure 1:
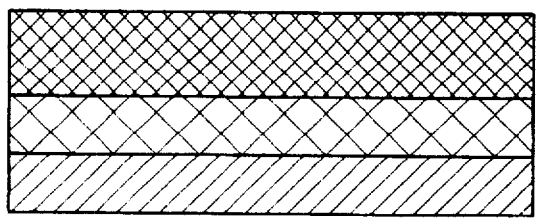
FIG. 1 is a representation of Example 1.

The foamed layers based on polyolefins of the present invention may be used in floor coverings. The present foamed layers are, like many other olefinic covering layers, substantially halogen-, heavy metal- and plasticizer-free. The present foamed layers are also substantially solvent-free and have a lower emission of harmful by-products than prior foamed compositions. The individual layers are preferably constructed and/or coordinated with one another, such that problem-free recycling is possible. Optionally, a pattern may be provided in the floor covering by employing a printed intermediate layer.

Surprisingly, the present inventors have found that polyolefin elastomers (POE) and/or polyolefin plastomers (POP) which are produced by the present polymerization process by the co-polymerization of ethylene with higher olefins using metallocene catalysts can, in contradistinction to the previously known polyolefins, including the known α-olefin/ethylene co-polymers (VLDPE), not only be worked up to give sheets, but decomposable materials contained in such new sheets can also react with foam formation.

The polymerization of POE and/or POP with metallocene catalysts is described in, for example, EP 0 461 815, U.S. Pat. No. 5,278,272, U.S. Pat. No. 5,278,236, EP 0 273 654, and EP 0 608 903. With these polymers, there can be produced non-cross-linked calender foams with properties comparable to those of foamed PVC coverings based on plastisol. The foam density typically lies in the range of 0.15–0.50 g/cm$^3$. In addition, the foams may be cross-linked if necessary for a particular intended use, and/or if high demands are made.

There are at least two known ways for making a foam: 1) physical foaming (adding a gas, such as butane); and 2) chemical foaming (adding substances which will decompose at a particular defined temperature). In the present invention, it is preferred to employ chemical foaming. Chemical foaming can be conducted using organic foam formers and/or inorganic foam formers. Many organic foamers used for forming foams develop nitrogene as a by-product upon reaching decomposition temperature. For example, azodicarbonamide is a frequently used foaming agent. Azodicarbonamide decomposes under heat to nitrogene and to an organic residue formed from cyanuric acid, which remains in the foam. It is also possible to use organic foamers such as oxazines, which form carbon dioxide and organic residues including aromatic polyamides.

In the present invention, an inorganic based foaming material such as sodium hydrogen-carbonate is preferably employed. Sodium hydrogen-carbonate decomposes under heat to sodium carbonate, carbon dioxide and water and leaves no residual organic residue in the foam layer.

It has been found that in the case of a foamed layer prepared according to the present invention, the use of the following components produce foamed layers having acceptable properties: 20–100% POE (Engage® 8501, MFI: 1.0, density 0.87 g/cm$^3$) polymerized with an α-olefin comonomer portion of 24% and/or 100–20% PoP (Affinity® DSH 1500, MFI: 1.0; density 0.902 g/cm$^3$ with an α-olefin co-monomer portion of 12%, as well as 0–80% of another polyolefin, each of the above-percentages being based on the total weight of the layer. Furthermore, the layer may also optionally contain up to 100 and preferably 20–50 parts by weight of a mineral filling material, such as chalk, kaolin, aluminum hydroxide, magnesium hydroxide, barytes and silicic acid, based on 100 parts of synthetic polymer material. Color-providing additives and adjuvants for simplifying the working up or processing steps of the layer may be optionally added to the polymeric material in amounts of up to 20 parts by weight, preferably up to 100 parts by weight based on the synthetic material. As propellants for the foam layer, propellants which are known to those of skill in the art, for example, azodicarbonamide, sodium hydrogen carbonate and oxy-bis-benzenesulphohydrazite may be used. If azodicarbonamide is employed, an activator based on zinc may optionally be used. Sodium hydrogen carbonate is a preferred propellant since it has a very slight inherent color.

The amount of the propellant depends upon the foaming conditions, the processing conditions, and upon the desired foam density. Preferably, 1 to 10 parts by weight of propellant are used per 100 parts of synthetic material. In the case of multi-layer coverings, any decorative layers and/or non-foamed sheets which are employed in the composite covering may be made up of the same olefinic raw material base as the foamed layer but without addition of propellant. This permits problem-free recycling of the composite. Thus, production waste, such as edge zones, cuttings and faulty batches, can be returned and/or recycled directly into the production. If cross-linking is desired, as cross-linker can be used, for example, a peroxide.

The covering may be optionally provided with a transparent, wear-resistant, halogen- and plasticizer-free wear layer, such as that described in EP 0 621 128.

Production of POE and POP

Hitherto, the production of olefin co-polymers using Ziegler-Natta catalysts is usual and known. Besides ethylene, α-olefins (propene, butene . . . octene and the like) can be used. This technology is generally limited, in that the lowest density range of ethylene co-polymers lies at 0.91. Because of the multiple active centers of Ziegler-Natta catalysts, different polymers with different co-monomer contents, molecular weights and also tacticity (distribution of the co-monomers) are also produced.

This leads to products, on the one hand, having very wide molecular weight distribution. On the other hand, these products, depending upon the proportion of co-monomers, mostly contain residual oligomers which, because of their migration tendency, lead to problems in further processing steps.

Metallocene catalyst technology includes metallocene catalysts, in contradistinction to Ziegler-Natta catalysts, having only one active center. Such metallocene catalysts are thereby able to build up specific molecules (See, for example, EP 0 461 815, U.S. Pat. No. 5,278,272, U.S. Pat. No. 5,278,236, EP 0 273 654 and EP 0 608 903).

In principle, according to the processes described in the above documents, it is possible to introduce whole polymer chains and thus, for example, to create long-chain side branches. Accordingly, it is possible to produce polymers with very great softness, low density (below 0.91 g/cm$^3$)

and/or a high degree of amorphousness. In addition, these polymers generally have a high degree of purity (substantially no migrating residual oligomers).

Polymers produced with metallocene catalysts generally possess the following advantages: relatively low melting points, suitable melt strengths and melt stabilities. Such advantages permit the production of non-cross-linked polyolefinic foams with very good properties.

Unless stated otherwise, the percentages and ratios of components listed herein refer to weight percentages.

EXAMPLES

Foil 1: Transparent Wear Layer

70% by weight of a polyethylene of very low density (VLLDPE) with an MFI of 1.1 (Dowlex® NG 5065 E) are premixed with 30% by weight of a polypropylene random copolymer with a co-monomer content of 5.5% and an MFI of 1.5 (Moplen® EP2 S 29 B) and with 0.2% by weight of a calcium stearate (Ceasit®I) and 0.2% by weight of a sterically-hindered phenol (Irganox® 10102) and with a light-protection agent on HALS basis (Tinuvin® 770 DF) in an amount of 0.8% by weight and plastified in a stamp kneader at 150° C. and subsequently further homogenized through on a two-roller mixing apparatus in order subsequently to be calendered via a 4-roller calendering apparatus to give a 0.08 to 1.0 mm thick transparent sheet, the working temperature from the first to the fourth calender roller thereby being lowered from 180° C. to 170° C.

Foil 2: Decorative Layer

POE (MFI 1.0 and d 0.87 g/cm$^3$) (Engage® 8501) or POP (MFI 1.0 and d 0.902 g/cm$^3$ ) (Affinity® DSH 1500) are pre-mixed in a ratio of 80:20 with the addition of: 65% filling material based on 100 parts of synthetic material, 2% of working-up adjuvants based on 100 parts of synthetic material, 5% of color-providing components based on 100 parts of synthetic material. The mixture is plastified in a stamp kneader. Subsequently, further homogenization is carried out on a two-roller mixing device and a continuous 0.4 mm thick sheet strip is rolled out via a 4-roller calendering plant, the working temperature thereby being increased from the first to the fourth calender roller from 100° C. to 130° C. The sheet is subsequently pre-treated and printed with aqueous print colors.

Foamed Sheet 1

POE (MFI 1.0 and d 0.87 g/cm$^3$) (Engage® 8501) or POP (MFI 1.0 and d 0.902 g/cm$^3$) (Affinity® DSH 1500) are premixed in a ratio of 70:30 with the addition of 25% filling material based on 100 parts of synthetic material, 2% working-up adjuvants based on 100 parts of synthetic material, 5% sodium hydrogen carbonate as propellant based on 100 parts of synthetic material, and the mixture is plastified in a stamp kneader. Subsequently, further homogenization is carried out in a two-roller mixing device and a continuous sheet strip is rolled out via a 4-roller calendering plant, the working temperature thereby increasing from 100° C. to 125° C. from the first to the fourth calendering roller. The calendering temperature was so chosen because it lies below the decomposition temperature of the propellant. In this way, there is obtained a compact 0.4 mm thick sheet. The sheet is first foamed up after the lamination.

Cross-Linked Foamed Sheet 1

POE (MFI 1.0 and d 0.87 g/cm$^3$ ) (Engage® 8501) or POP (MFI 1.0 and d 0.902 g/cm$^3$) (Affinity® DSH 1500) are premixed in a ratio of 70:30 with the addition of 25% of filling material based on 100 parts of synthetic material, 2% working-up adjuvants based on 100 parts of synthetic material, 5% sodium hydrogen carbonate as propellant based on 100 parts of synthetic material and 1% butyl-cunyl peroxide as cross-linker based on 100 parts of synthetic material. These materials are plasticized in a stamp kneader. Subsequently, further homogenization is carried out on a two-roller mixing device and a continuous 0.4 mm thick sheet strip is rolled out via a 4-roller calendering plant, the working temperature thereby increasing from 100° C. to 125° C. from the first to the fourth calendering roller. The working temperature on the calender hereby lies below the activation temperature of the crosslinker and below the decomposition temperature of the propellant. There is hereby obtained a 0.4 mm thick compact sheet. This is also first foamed in the composite.

EXAMPLES OF USE

Example of Use No. 1 (FIG. 1)

On a doubling calender plant, sheet 1 (transparent wear layer), sheet 2 (decorative layer) and foamed sheet 1 are assembled to give a 1.1 mm thick sheet strip and subsequently foamed at 185° C. in a canal to give a final thickness of 2 mm. A release paper can possibly be used as substrate for the foaming.

Figure 2:
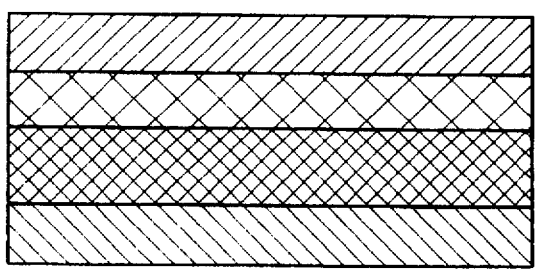
FIG. 2 is a representation of Example 2.

Example of Use No. 2 (FIG. 2)

The procedure is analogous to Example No. 1; however, a further sheet 2, which may be printed on the lower side, is placed below the foamed sheet. The foamed covering has a total thickness of 2.5 mm.

Figure 3:
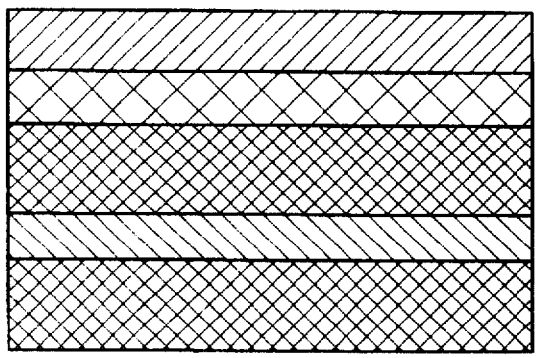
FIG. 3 is a representation of Example 3.

Example of Use No. 3 (FIG. 3)

The procedure is analogous to Example No. 1. Various foamed and compact sheets can be combined with one another in order to achieve different property profiles.

Figure 4:
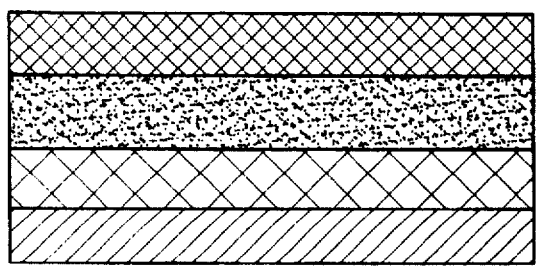
FIG. 4 is a representation of Example 4.

Example of Use No. 4 (FIG. 4)

The procedure is analogous to Example No. 1 with the combination of a sheet 1, of a sheet 2, of a cross-linkable layer and of a non-cross-linked foamed layer. The use of a cross-linked layer makes possible an additional stability of the foamed underlayer.

The coverings so obtained have mechanical properties comparable with CV coverings but not the environmental problems thereof.

TABLE

|  | CV covering | PO covering Example No. 3 |
|---|---|---|
| residual impression (EN 433) | 0.30 mm | 0.26 mm |
| resiliency | 85% | 86% |
| total thickness | 3.5 mm | 3.0 mm |
| footstep noise protection improvement according to DIN 52210 | 17 dB | 14 dB |
| floor heating | suitable | suitable |
| wear layer | 0.25 mm | 0.25 mm |
| light fastness DIN 53389 | stage 6–7 | stage 6–7 |

Depending upon the nature of the transparent covering, it is possible to obtain a chemical inhibition comparable with PVC-CV coverings. Any kind of mechanical embossing is conceivable.

Additional advantages and modifications will readily occur to those skilled in the art. Therefore, the invention in its broader aspects is not limited to the specific details and representative devices, shown and described herein. Accordingly, various modifications may be made without departing from the spirit or scope of the general inventive concept as defined by the appended claims and their equivalents.

The priority document, German application number 195 48 681.1 is incorporated herein in its entirety including the title, abstract, drawings, specification and claims.

What is claimed is:

1. A process for the production of at least one foamed layer comprising:
    obtaining a polyolefin elastomer (POE) or polyolefin plastomer (POP) which has been polymerized with a metallocene catalyst, and optionally mixing said polyolefin elastomer or polyolefin plastomer with one or more additional polyolefins to form a polymerized polyolefin;
    mixing said polymerized polyolefin, up to 100 parts by weight of a mineral filling material and from 1–10 parts by weight of a chemical propellant based on 100 parts by weight of said polymerized polyolefin to form a sheet layer mixture;
    rolling said sheet layer mixture on a calender to produce a sheet layer; and
    heating at least one sheet layer at a temperature above the decomposition point of the chemical propellant so as to foam the sheet layer and form at least one foamed layer.

2. A process according to claim 1, wherein 20 to 50 parts by weight of filling material are used per 100 parts by weight of polyolefin.

3. A process according to claim 1, wherein said sheet layer includes an open-lying side, and the open-lying side of the layer to be foamed is covered prior to said heating, with a release layer.

4. A process according to claim 1, further comprising forming a composite with a foamed layer and at least one unfoamed layer comprising the same polyolefin(s) as the foamed layer.

5. A process according to claim 1, wherein said sheet layer mixture further comprises a cross-linking agent which reacts at the foaming temperature thereof and brings about a consolidation of the layer in said heating step.

6. A process according to claim 1, further comprising the step of printing at least one layer with a decoration and/or an inhibitor or accelerator for the chemical propellant.

7. A covering comprising at least one foamed layer produced by the process according to claim 1.

8. A process according to claim 1, wherein said polyolefin elastomer or said polyolefin plastomer is present in an amount from 20–100% by weight based on the total weight of the polymerized polyolefin.

9. A process according to claim 1, wherein said additional olefins are present in an amount from 0 to 80% by weight based on the total weight of polymerized polyolefin.

10. A process according to claim 1, comprising the step of processing two or more sheets on a doubling calender plant and heating them to form two or more foamed layers.

11. A process according to claim 1, wherein said heating is conducted in a foaming oven.

12. A process according to claim 1, wherein said foamed layer is substantially halogen-free, plasticizer-free, heavy-metal-free, and solvent-free.

13. A process according to claim 1, wherein said calender is a multi-roller calender.

14. A process according to claim 1, wherein two or more sheet layers are employed, and each of said layers being substantially propellent-free.

* * * * *